US009300485B2

(12) United States Patent
Van Loon et al.

(10) Patent No.: US 9,300,485 B2
(45) Date of Patent: Mar. 29, 2016

(54) INFORMATION TRANSMISSION IN A MACHINE-TO-MACHINE TELECOMMUNICATIONS NETWORK

(75) Inventors: Johannes Maria Van Loon, Zoetermeer (NL); Antonius Norp, The Hague (NL); Michael Schenk, The Hague (NL); Annemieke Kips, Leiden (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 752 days.

(21) Appl. No.: 13/383,585

(22) PCT Filed: Jul. 1, 2010

(86) PCT No.: PCT/EP2010/059387
§ 371 (c)(1),
(2), (4) Date: Jan. 12, 2012

(87) PCT Pub. No.: WO2011/006768
PCT Pub. Date: Jan. 20, 2011

(65) Prior Publication Data
US 2012/0106391 A1    May 3, 2012

(30) Foreign Application Priority Data

Jul. 17, 2009  (EP) .................................... 09009323

(51) Int. Cl.
*H04L 12/18*  (2006.01)
*H04L 12/801*  (2013.01)
(Continued)

(52) U.S. Cl.
CPC ............ *H04L 12/1886* (2013.01); *H04L 47/10* (2013.01); *H04L 47/12* (2013.01); *H04L 47/14* (2013.01); *H04L 67/12* (2013.01); *H04W 4/00* (2013.01); *H04W 4/005* (2013.01)

(58) Field of Classification Search
CPC ....... H04W 92/02; H04W 4/00; H04W 4/005; H04M 15/43; H04M 15/80; H04M 15/66; H04M 15/55; H04L 12/1886; H04L 47/10; H04L 47/12; H04L 67/12; H04L 47/14
USPC .................................................. 370/252–356
See application file for complete search history.

(56) References Cited

U.S. PATENT DOCUMENTS

| 6,608,832 B2 * | 8/2003 | Forslow ........................ 370/353 |
| 6,996,410 B2 * | 2/2006 | Bos et al. ...................... 455/466 |

(Continued)

FOREIGN PATENT DOCUMENTS

| WO | 0251187 | 6/2002 |
| WO | 2007098722 | 9/2007 |

OTHER PUBLICATIONS

Extended European Search Report, mailed Oct. 1, 2009 in connection with European Patent Application No. 09009323.8.

(Continued)

*Primary Examiner* — Nicholas Sloms
(74) *Attorney, Agent, or Firm* — Hamilton, Brook, Smith & Reynolds, P.C.

(57) ABSTRACT

The invention relates to a method for information transmission in a machine-to-machine telecommunications network and a machine-to-machine telecommunications network. The telecommunications network supports information transmission between a server and a plurality of communication terminals. A common group identifier is assigned to a group containing at least some of the plurality of communication terminals. An information message is transmitted to the plurality of communication terminals to which the common group identifier has been assigned. The information message contains the common group identifier.

8 Claims, 13 Drawing Sheets

(51) Int. Cl.
*H04W 4/00* (2009.01)
*H04L 29/08* (2006.01)

(56) References Cited

U.S. PATENT DOCUMENTS

| | | | |
|---|---|---|---|
| 7,301,927 B2 * | 11/2007 | Lee et al. | 370/338 |
| 7,308,278 B2 * | 12/2007 | Park | 455/503 |
| 7,899,039 B2 * | 3/2011 | Andreasen et al. | 370/354 |
| 8,018,955 B2 * | 9/2011 | Agarwal et al. | 370/401 |
| 8,064,909 B2 * | 11/2011 | Spinelli et al. | 455/436 |
| 8,131,831 B1 * | 3/2012 | Hu | 709/223 |
| 8,229,346 B2 * | 7/2012 | Zisimopoulos | 455/3.02 |
| 8,280,374 B2 * | 10/2012 | Matti et al. | 455/435.1 |
| 8,326,263 B2 * | 12/2012 | Zhou et al. | 455/408 |
| 8,375,128 B2 * | 2/2013 | Tofighbakhsh et al. | 709/226 |
| 8,379,599 B2 * | 2/2013 | Velev et al. | 370/331 |
| 8,489,096 B2 * | 7/2013 | Rasanen | 455/436 |
| 8,595,358 B2 * | 11/2013 | Yuen et al. | 709/225 |
| 8,688,784 B2 * | 4/2014 | Zabawskyj et al. | 709/205 |
| 8,699,462 B2 * | 4/2014 | Spinelli et al. | 370/331 |
| 8,718,607 B2 * | 5/2014 | Mohajeri | 455/411 |
| 8,730,828 B2 * | 5/2014 | Doppler et al. | 370/252 |
| 8,761,091 B2 * | 6/2014 | Zisimopoulos et al. | 370/329 |
| 2004/0102204 A1 * | 5/2004 | Bar-On | 455/517 |
| 2006/0119882 A1 * | 6/2006 | Harris et al. | 358/1.15 |
| 2007/0253365 A1 * | 11/2007 | Hedberg et al. | 370/329 |
| 2009/0156213 A1 * | 6/2009 | Spinelli et al. | 455/436 |
| 2009/0217348 A1 * | 8/2009 | Salmela et al. | 726/2 |
| 2010/0215040 A1 * | 8/2010 | Kappler et al. | 370/390 |
| 2010/0317339 A1 * | 12/2010 | Koc | 455/424 |
| 2012/0044908 A1 * | 2/2012 | Spinelli et al. | 370/331 |
| 2012/0106391 A1 * | 5/2012 | van Loon et al. | 370/252 |
| 2012/0140632 A1 * | 6/2012 | Norp et al. | 370/235 |
| 2013/0273886 A1 * | 10/2013 | Mohajeri | 455/411 |
| 2013/0290537 A1 * | 10/2013 | Shaw | 709/226 |
| 2013/0324082 A1 * | 12/2013 | Mohajeri | 455/411 |
| 2013/0336118 A1 * | 12/2013 | Shaw et al. | 370/235 |
| 2014/0059343 A1 * | 2/2014 | Mohajeri et al. | 713/162 |
| 2014/0112251 A1 * | 4/2014 | Kim et al. | 370/328 |

OTHER PUBLICATIONS

International Search Report issued in International Application No. PCT/EP2010/059387, mailed on Aug. 17, 2010.

Machine translation of description and claims of WO 02/51187 A1.

* cited by examiner

| Group Record |
|---|
| Group ID |
| Group load condition |
| Congestion parameter adjustment policies |
| Individual subscriptions IDs of terminals/bearers in group |

FIG. 4B

| Individual subscription record |
|---|
| Individual subscription ID |
| Individual QoS and Charging Policies |
| Other subscription information (e.g. Group subscription ID) |

FIG. 4A

| Group rule |
|---|
| Group rule ID |
| Flow detection info for Group |
| Group load condition |
| ---- |
| PCC rule IDs for terminals/bearers in group |

FIG. 6B

| Individual PCC rule |
|---|
| PCC rule ID |
| Flow detection info |
| QoS and Charging treatment |
| (Further information) |

FIG. 6A

INFORMATION TRANSMISSION IN A MACHINE-TO-MACHINE TELECOMMUNICATIONS NETWORK

PRIORITY CLAIM TO RELATED APPLICATIONS

This application is a national stage application under 35 U.S.C. §371 of PCT/EP2010/059387, filed Jul. 1, 2010, published as WO 2011/006768 A1 on Jan. 20, 2011, which claims priority to European Application No. 09009323.8, filed Jul. 17, 2009, which applications and publications are incorporated herein by reference and made a part hereof in their entirety, and the benefit of priority of which is claimed herein.

FIELD OF THE INVENTION

The invention relates to a method and telecommunications network for information transmission in machine-to-machine communications.

BACKGROUND OF THE INVENTION

Telecommunications networks that provide wireless access (e.g. GSM, UMTS, WiMax, LTE) have developed tremendously over the past years. In such networks, voice and data services can be provided to terminals having a high mobility, i.e. the communication terminals are not bound to a particular location and are freely movable through the area covered by the network. A gateway node of the telecommunications network enables connection to a further network, for example a network based on IP such as the internet.

The availability of such a telecommunications network connected to the further network has resulted in demands for further services, including services that relate to so-called machine-to-machine (M2M) services. Machine type communication is currently being standardized in 3GPP TS 22.368. M2M applications typically involve hundreds, thousands or millions of communication modules which each act as a communication terminal to the telecommunication network. An example involves the electronic reading of e.g. 'smart' electricity meters at the homes of a large customer base over the telecommunications network from a server connected to the further network. A characteristic of some of the M2M applications is that the exchange of data with the server is infrequent, for example once every day or so for a smart electricity meter.

Other examples include sensors, meters, vending or coffee machines etc. that can be equipped with communication modules that allow reporting status information to a data processing centre over the telecommunications network. Such devices may also be monitored by the server. The data processing centre may e.g. store the data and/or provide a schedule for maintenance people to repair or refill a machine, meter, sensor etc.

Various information messages may need to be transmitted to the large amount of communication terminals. It may occur that information messages need to be transmitted to a considerable number of the communication terminals in a short time frame. Such information messages may result in a considerable message load for the telecommunications network. The message load may relate both to the signalling load incurred on the transmission links used for the exchange of the information messages and incurred in the involved nodes to transmit and receive the information messages and to the processing load incurred in the affected nodes to process the information contents of the information messages. Therefore, there is a need for a more efficient transmission of information messages for M2M communications.

SUMMARY OF THE INVENTION

A method for information transmission in a machine-to-machine telecommunications network is disclosed. The telecommunications network supports information transmission between a server and a plurality of communication terminals. A common group identifier is assigned to a group containing at least some of the plurality of communication terminals. An information message is transmitted to the plurality of communication terminals to which the common group identifier has been assigned. The information message contains the common group identifier.

Furthermore, a machine-to-machine telecommunications network supporting information transmission between a server and a plurality of communication terminals is disclosed. The telecommunications network comprises a first storage node configured for storing a common group identifier assigned to a group containing at least some of the plurality of terminals. The telecommunications network also includes a transmitter arrangement configured for including the common group identifier in an information message and transmitting the information message containing the common group identifier to the plurality of communication terminals.

Specific characteristics of M2M telecommunications networks are defined in 3GPP TS 22.368. By using the common group identifier, the number of information messages can be smaller than the number of communication terminals for at least a part of the M2M telecommunications network. Accordingly, the message load, comprising e.g. signalling load and/or processing load related to the information messages, for this (part of the) telecommunications network is reduced. Preferably, the (part of the) telecommunications network for which the message load is reduced only carries a single information message containing the relevant information and the common group identifier.

The information messages may relate to various types of information, including (but not limited to) information concerning modification of bearers for the communication terminals, modification of other QoS parameters and a modified access point name (APN).

The embodiments of claims 2 and 12 provide the advantage of obviating the need for the communication terminals to have access to the common group identifier while being able to reduce the message load for the part of the M2M telecommunications network wherein the common group identifier is contained in the information message. Thus, in these embodiments, the transmitting of the information message containing the common group identifier occurs in only a part of the M2M telecommunications network and is converted to individual information messages before reaching the communication terminals.

The embodiments of claims 3 and 13 provide the advantage of reducing the message load of the machine-to-machine telecommunications network for a considerable part of the telecommunications network. In these embodiments, the transmission of the information message containing the common group identifier indeed reaches the communication terminals, i.e. this information message is destined for the communication terminals. As an example, for a wireless access machine-to-machine telecommunications network, message load reduction can be obtained also for the radio path to the communication terminals.

The embodiments of claims 4 and 14 provide the advantage of informing the communication terminals of the common group identifier. This process may e.g. be performed during an access request procedure for a communication terminal to the M2M telecommunications network. In this way, the communication terminals may also be informed of a modified or an additional common group identifier for the communication terminal. Alternatively, the common group identifier is pre-stored in the communication terminal.

The embodiment of claim 5 provides the advantage that the communication terminals of the group only need to monitor the particular broadcast channel, instead of a general broadcast channel also used for other information. The particular broadcast channel can be communicated to the communication terminals from the M2M telecommunications network, e.g. during attach to the network or via a previous information message (possibly also using the common group identifier. This approach also enables changing the particular broadcast channel for one or more communication terminals of the group. The particular broadcast channel may also be pre-stored in the communication terminals.

In various cases, e.g. when congestion occurs either in the M2M telecommunications network or in a further network connecting the M2M telecommunications network with the M2M server, the communication terminals should advantageously be informed (e.g. via a signalling message) of an adjustment of the bearer characteristics, e.g. to reduce the maximum bit rate to the data transmission in the uplink direction, as defined in the embodiment of claim 6. When such adjustment information is to be communicated to a considerable number of communication terminals, this may result in a considerable message load in the network. The use of the common group identifier reduces the message load in the network.

The embodiments of claims 7 and 15 provide an advantageous embodiment for controlling congestion and informing the communication terminals of required modifications, both using the common group identifier. It should be appreciated that the disclosed embodiments relate to congestion occurring in the telecommunications network itself and/or in the further network(s) provided between the telecommunications network and the server. It should also be appreciated that the monitoring step for monitoring the group load indicator and the comparing step for comparing the monitored group load indicator with the group load condition in these embodiments are not necessarily two individual subsequent steps, but may e.g. be integrated in a single step.

Also, usually a communication terminal uses a single bearer in the telecommunications network for supporting one or more data sessions between the communication terminal and the server. The common group identifier may then relate to the communication terminal, which corresponds one-to-one with the bearer. However, in a case where communication terminals use more than one bearer, group identifiers may be assigned on a per-bearer basis, such that a single communication terminal can be assigned to several groups.

The individual congestion parameters of the bearers of the terminals of the group are congestion-related communication parameters of the contexts (e.g. PDP Contexts) of individual terminals of the group. An example of such a congestion parameter comprises a (maximum) bit rate that is agreed for the bearer. The group load indicator relates to the actually measured load at a particular point in time or during a time interval for the group of terminals. As an example, the group load indicator is a measure of the actual bit rate used by the terminals, which bit rate is monitored in the telecommunications network. The group load condition is a condition that, when satisfies, triggers the adjustment of congestion parameters of the individual bearers of the terminals of the group. As an example, the group load condition comprises a bit rate threshold for the group. When the monitored actual bit rate of the terminals exceed the group bit rate threshold, the agreed congestion parameters for the bearers of (at least one or some of) the individual terminals are adjusted. The adjusted congestion parameters are then enforced and congestion is avoided or reduced.

The detection that the group load condition is satisfied does not necessarily mean that actual congestion has occurred. The group load condition may be defined such that the adjustment of the individual congestion parameters is triggered before a congestion state would occur. As an example, selecting a lower threshold value as a group load condition may prevent congestion rather than only to resolve it with a higher threshold value.

Actions to resolve congestion may comprise other actions than downwardly adjusting the individual maximum bit rates for the individual terminals, including the modifying of QoS attributes of one or more of the terminals. As an alternative, additional capacity can be (temporarily) assigned to the terminals of the group. The communication terminal may be informed by an information message of the modification.

The disclosed method and telecommunications network allow, in addition to defining (values of) congestion related parameters for individual communication terminals, to define a group load condition for the communication terminals belonging to the group identified by the common group identifier. By monitoring the group load indicator of the group of terminals, the group load condition allows the operator of the telecommunications network, to anticipate congestion by comparing the group load indicator with the group load condition and to act by adjusting the individual congestion parameters of the terminals in the group and enforce these in order to avoid or to relieve congestion caused by terminals of the group.

As an example, the operator of the telecommunications network may define a group bit rate threshold for a group of communication terminals. When the group bit rate exceeds the group bit rate threshold, the operator of the telecommunications network is able to decrease the agreed bit rates of individual communication terminals in order to relieve the congestion in the telecommunications network.

The embodiment of claim 8 defines that bit rate is an important parameter for congestion control.

The embodiment of claim 9 provides flexibility for the owner/operator of the M2M server by enabling assigning of communication terminals to one or more groups. As an example, individual congestion parameters of one or more communication terminals within a group may be (temporarily) adjusted. The owner/operator of the server may flexibly adjust the (value of the) congestion parameters of one or more individual terminals within the group as long as the group congestion condition for aggregated communication terminals is not met.

The embodiment of claim 10 allows assigning of a communication terminal to multiple groups.

Hereinafter, embodiments of the invention will be described in further detail. It should be appreciated, however, that these embodiments may not be construed as limiting the scope of protection for the present invention.

BRIEF DESCRIPTION OF THE DRAWINGS

In the drawings:

FIGS. 4A and 4B depict an individual subscription record and a group record according to an embodiment of the invention;

FIGS. 6A and 6B depict an individual PCC rule and a group rule according to an embodiment of the invention to be used in a congestion control method performed in the telecommunications network of FIG. 5 in combination with the records of FIGS. 4A and 4B;

DETAILED DESCRIPTION OF THE DRAWINGS

Figure 1:
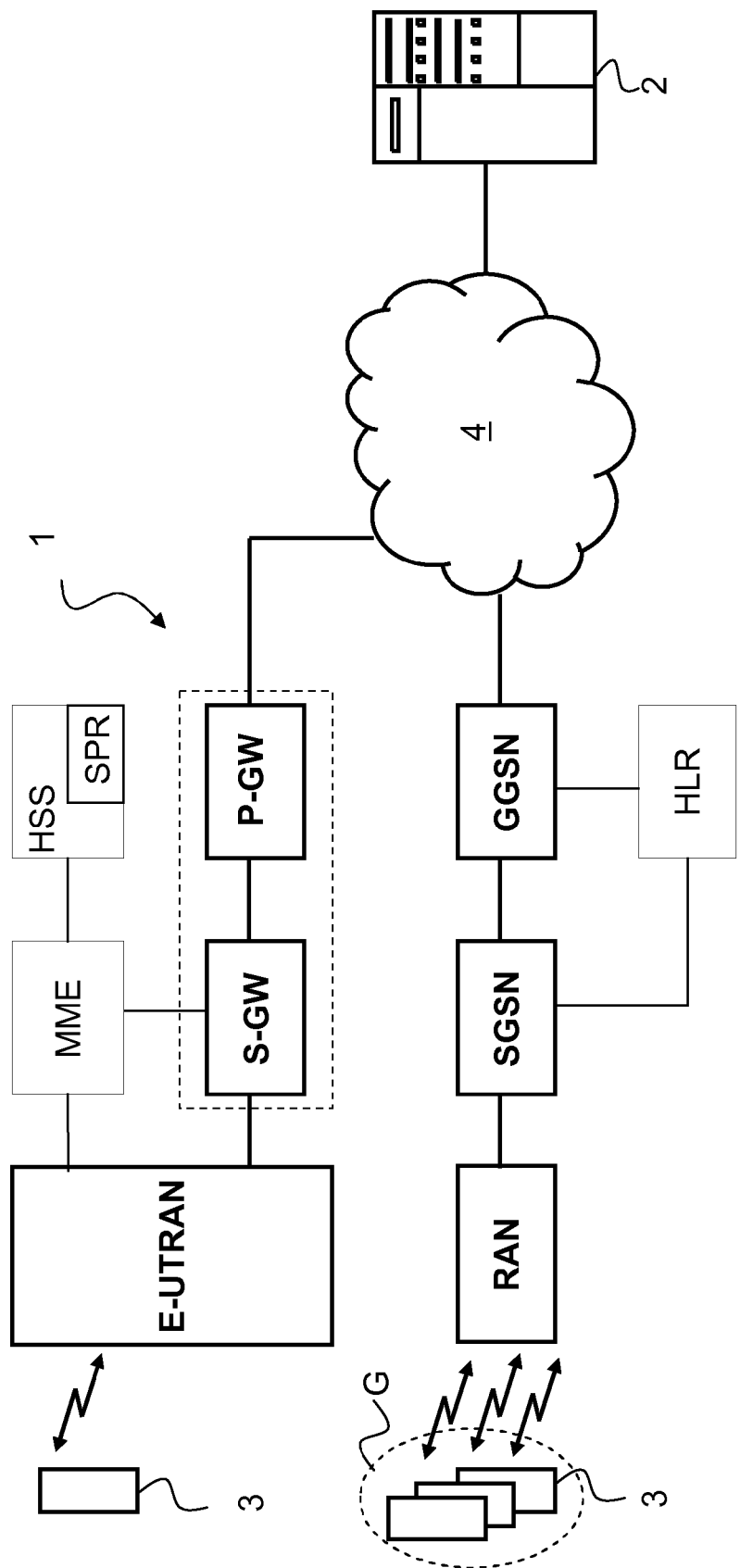
FIG. 1 is a schematic illustration of a prior art telecommunications network connecting communication terminals to a server over a further network.

FIG. 1 shows a schematic illustration of a telecommunications network 1. The telecommunications network 1 allows data sessions between a server 2 and a terminal 3 over a packet data network 4, wherein access of the terminal to the telecommunications network 1 is wireless.

In the telecommunications network of FIG. 1, three generations of telecommunications networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network comprising a Gateway GPRS Support Node (GGSN), a Serving GPRS Support Node (SGSN) and a Radio Access Network (RAN or UTRAN). For a GSM/EDGE radio access network (GERAN), the RAN comprises a Base Station Controller (BSC) connected to a plurality of Base Station Transceivers (BTSs), both not shown. For a UMTS radio access network (UTRAN), the RAN comprises a Radio Network Controller (RNC) connected to a plurality of NodeBs), also not shown. The GGSN and the SGSN are conventionally connected to a Home Location Register (HLR) that contains subscription information of the terminals 3.

The upper branch in FIG. 1 represents a next generation telecommunications network, commonly indicated as Long Term Evolution (LTE) or Evolved Packet System (EPS). Such a network comprises a PDN Gateway (P-GW) and a Serving Gateway (S-GW). The E-UTRAN of the EPS comprises evolved NodeBs (eNodeBs or eNBs) providing wireless access for a terminal 3 that is connected to the S-GW via a packet network. The S-GW is connected to a Home Subscriber Server HSS and a Mobility Management Entity MME for signalling purposes. The HSS includes a subscription profile repository SPR.

Further information of the general architecture of a EPS network can be found in 3GPP TS 23.401.

Of course, architectures other than defined by 3GGP, e.g. WiMAx or cable networks, can also be used within the context of the present invention.

Whereas the invention as defined in the appended claims is generally applicable to such networks, a more detailed description will be provided below for a GPRS/UMTS network.

For such a network, the SGSN typically controls the connection between the telecommunications network 1 and the terminal 3. It should be appreciated that the telecommunications network 1 generally comprises a plurality of SGSNs, wherein each of the SGSNs is connected typically to several BSCs/RNCs to provide a packet service for terminals 3 via several base stations/NodeBs.

The GGSN is connected to the packet data network 4, e.g. the internet, a corporate network or a network of another operator. On the other side, the GGSN is connected to one or more SGSNs.

The GGSN is configured for receiving a data unit for the terminal 3 from the server 2 over the network 4 (downlink) and for transmitting a data unit to the server 2 received from the terminal 3 (uplink).

In an M2M environment, a single server 2 normally is used for communication with a large number of terminals 3. Individual terminals 3 can be identified by individual identifiers, such as an IP address, an IMSI or another terminal identifier.

Figure 2A:
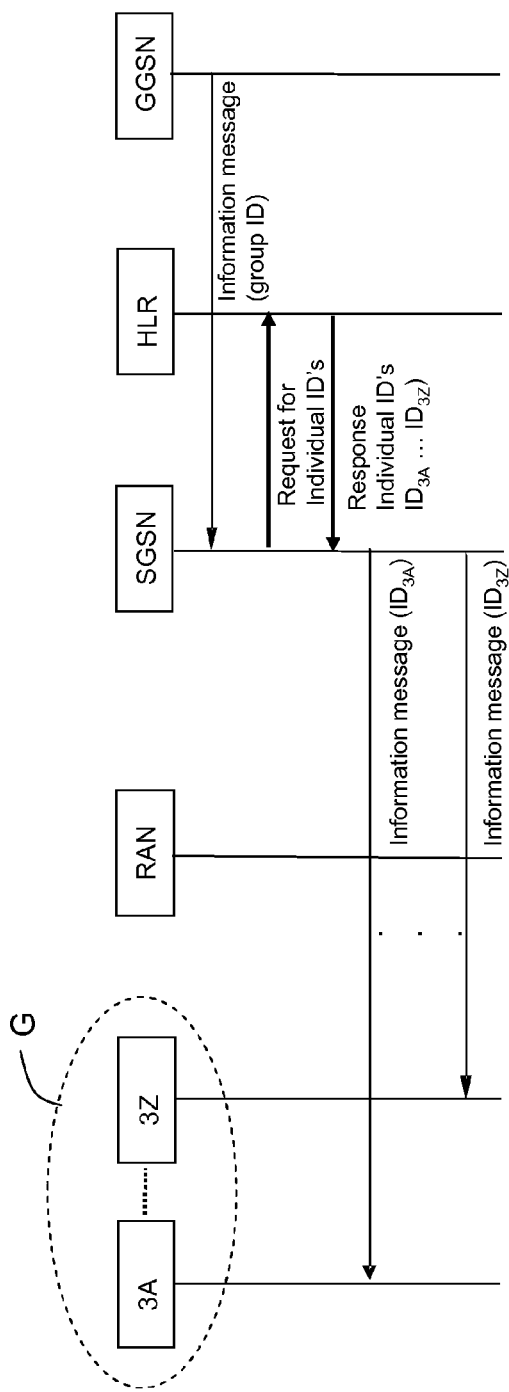
FIGS. 2A and 2B depict schematic diagrams illustrating two embodiments of transmitting an information message in a machine-to-machine telecommunications network.
Figure 2B:
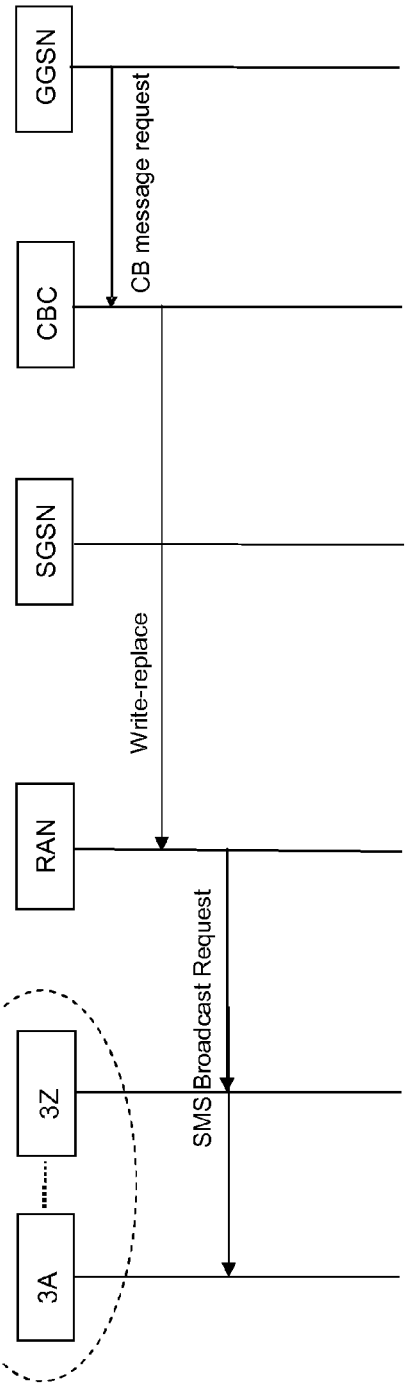

FIGS. 2A and 2B depict schematic diagrams illustrating two embodiments of the present invention for transmitting an information message in a machine-to-machine telecommunications network.

For FIG. 2A, the GGSN sends a single information message containing a common group identifier for communication terminals 3A-3Z to the SGSN. The SGSN retrieves information from the HLR to obtain individual identifiers $ID_{3A} \ldots ID_{3Z}$ for each of the communication terminals 3A-3Z in a request-response interaction with the HLR. Having obtained the individual terminal identifiers, the SGSN transmits corresponding information messages to the communication terminals 3A-3Z, using the individual identifiers $ID_{3A} \ldots ID_{3Z}$.

Figure 10:
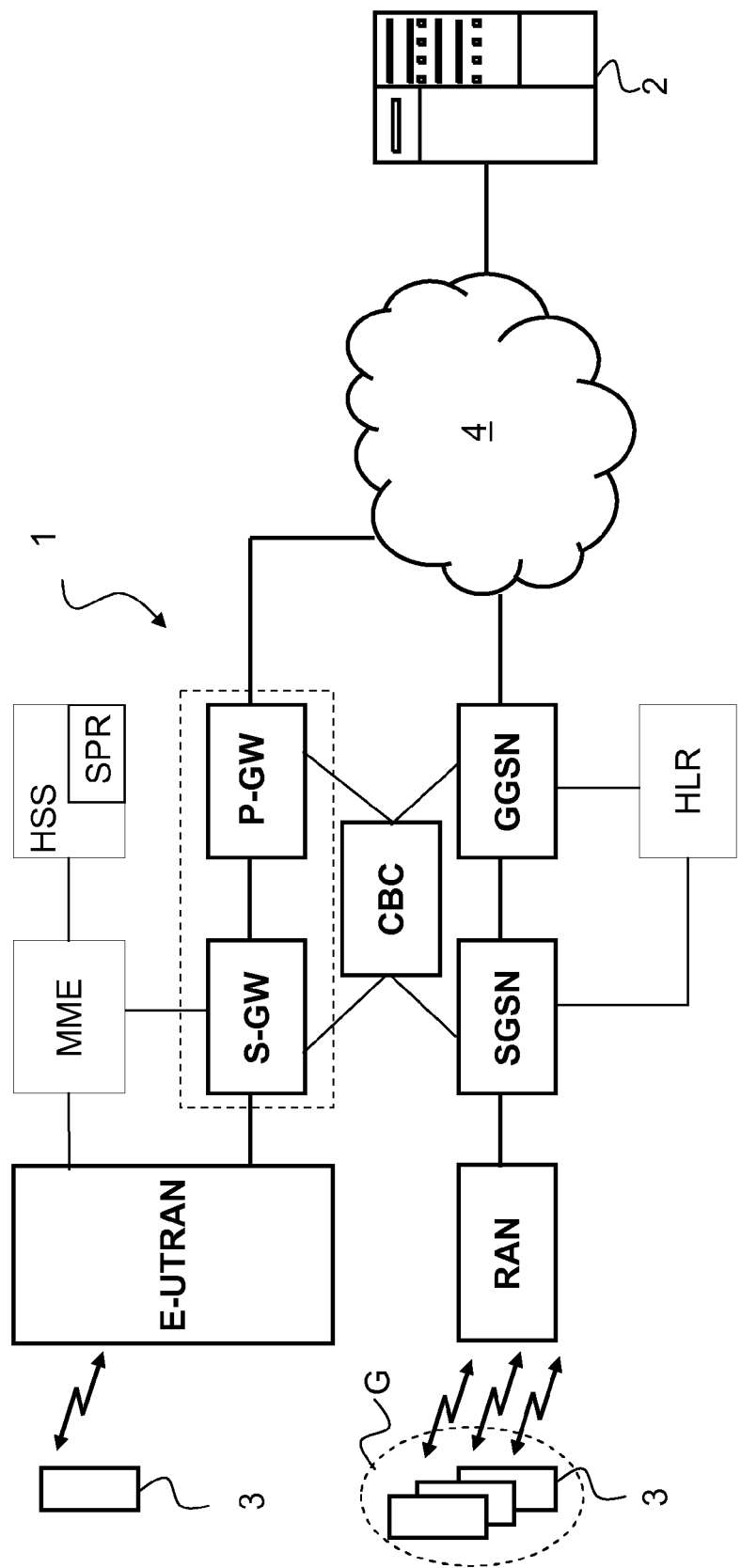
FIG. 10 depicts a schematic illustration of a telecommunications network including a cell broadcast centre.

For FIG. 2B, the GGSN sends a cell broadcast (CB) message request to a cell broadcast centre CBC (see e.g. FIG. 10). The cell broadcast centre CBC transfers the CB message in Write-Replace messages to the RAN i.e. to one or more BSCs/RNCs according to the (defined) cell broadcast area. In turn the RAN, via an SMS Broadcast Request, requests to broadcast the CB message in the defined areas in step. The CB message contains also the common group identifier for group G. Each communication terminal receiving the broadcast message containing the common group identifier is then able to determine whether or not the received message is destined for that terminal. That is the case when at least one of the group identifiers in a received message matches at least one of the terminal's group identifiers.

It should be noted that the M2M communications network may be configured for having a plurality of broadcast channels. This provides the advantage that the communication terminals 22A-3Z of the group G only need to monitor the particular broadcast channel, instead of a general broadcast channel also used for other information. The particular broadcast channel can be communicated to the communication terminals 3A-3Z from the M2M telecommunications network, e.g. during attach to the network or via a previous information message (possibly also using the common group identifier. This approach also enables changing the particular broadcast channel for one or more communication terminals of the group. The particular broadcast channel may also be pre-stored in the communication terminals.

While the information messages using the common group identifier may contain various types of information, the information messages can be advantageously applied in combination with congestion control, for which the same common group identifier can be used. This aspect will be described in more detail with reference to the remaining figures.

Figure 3:
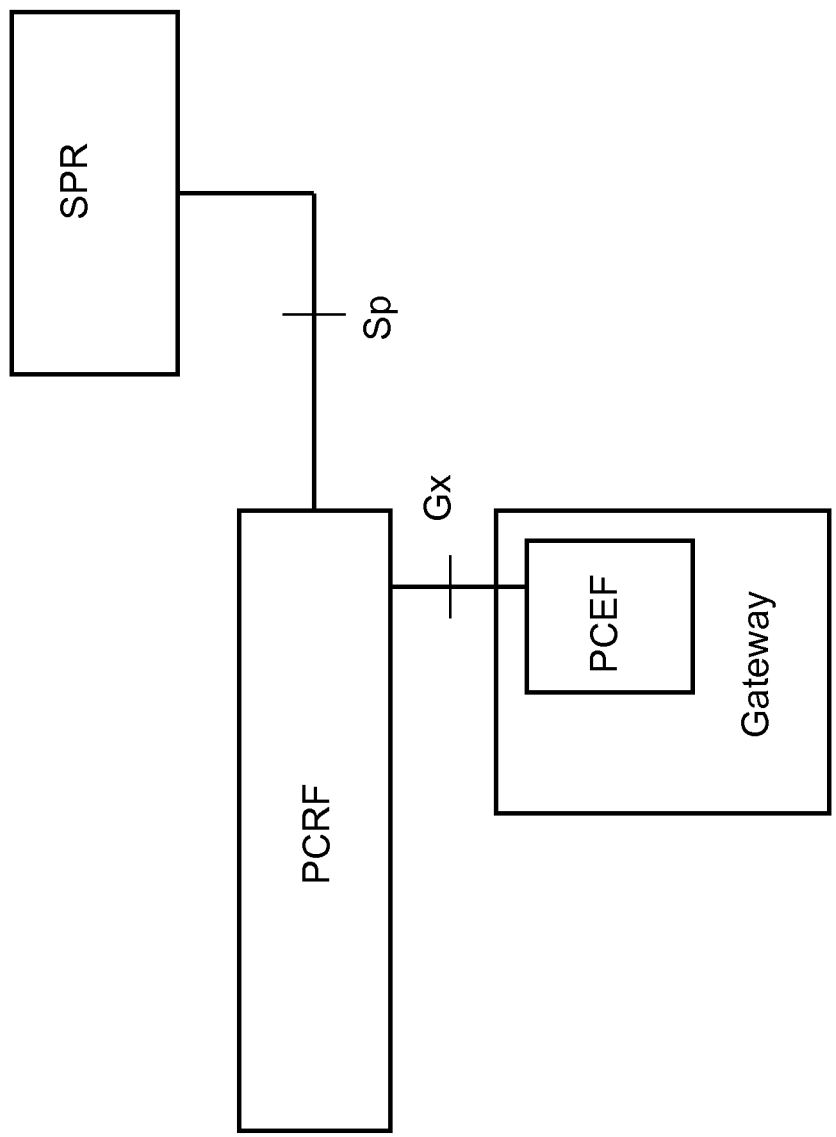
FIG. 3 is a schematic illustration of a prior art policy and charging control (PCC) architecture to be used in the telecommunications network of FIG. 1.

FIG. 3 shows a policy and charging control (PCC) architecture, known from 3GGP TS 23.203 which is included in the present application by reference in its entirety, that can be included in a GPRS, UMTS, LTE or other type of telecommunication network 1.

The central element in the PCC architecture of FIG. 3 is the policy and charging rules function PCRF. The PCRF takes policy decisions related to quality of service (QoS) and charging treatment of service data sessions in an IP Connectivity Access Network (IP-CAN). An IP-CAN is a network capable of supporting IP-CAN bearers over which data sessions may be defined. IP-CAN bearers are IP transmission paths defined by e.g. capacity, delay, bit error rate.

In its decisions, the PCRF takes into account subscription information received from the SPR over the Sp interface and information on the capabilities of the IP-CAN. The PCRF formats its policy decisions in so-called PCC rules. PCC rules are sets of information enabling the detection of a service data flow and providing parameters for policy control and/or charging control. Such a PCC rule contains among others information to detect a service data flow (e.g. the 5-tuple source/destination IP address, source/destination port number, protocol) and information on the required QoS and charging treatment for the service data flow. It also includes a maximum bit rate authorized for the service data flow, separately for uplink and downlink. PCC rules may be predefined or dynamically provisioned at establishment and may then be re-defined during the lifetime of an IP-CAN session.

The PCRF communicates its decisions, formatted as so-called PCC rules, towards the Policy and Charging Enforcement Function (PCEF) over the Gx interface. These PCC rules are coupled to IP-CAN bearers in the binding process by either PCRF or PCEF. Furthermore, the PCRF informs the PCEF on network events at whose occurrence it wants to be notified.

The PCEF encompasses service flow detection, policy enforcement and flow based charging functionalities. These functions are performed according to PCC rules either received from the PCRF (dynamic PCC rules) or predefined in the PCEF itself (predefined PCC rules). Furthermore the PCEF informs the PCRF over the Gx interface on network events requiring notification towards the PCRF. The PCEF is located in a Gateway Node (e.g. the GGSN or the P-GW in FIG. 1), that connects the IP-CAN to the external Packet Data Network 4. The network 4, connected to the server 2, can be any network or combination of networks to support the communication between the gateway of telecommunications network 1 and the server 2, for example a dedicated line (copper or fibre-optic cable connecting the gateway to the server 2), a backbone IP network, etc.

The SPR contains all subscription information needed for making subscription-based policy decisions by the PCRF for individual communication terminals 3 based on an individual subscriber identifier, such as IMSI. The subscription information is requested by the PCRF over the Sp interface. The SPR may also notify the PCRF when the subscription information has been changed. The SPR does not necessarily result in a duplication of subscription information in the network. The SPR may for instance contain the HSS or HLR.

As shown in FIG. 1, a group G of terminals 3 can be connected or connectable to the telecommunications network 1 in order to have a data session with the server 2 over the telecommunications network and the packet network 4. In order to identify such a group of terminals 3, in an aspect of the present invention, the HLR and/or SPR may store a common group identifier in relation with a group record in addition to individual subscription records containing the above-mentioned subscription information for individual terminals 3.

FIGS. 4A and 4B illustrate an individual subscription record and a group record. The individual subscription record contains subscription information for each terminal 3 individually. The individual subscription record contains for example the individual subscription identifier, the individual QoS and charging policies, which may include a maximum bit rate for the uplink and downlink direction (possibly different for uplink and downlink), a guaranteed bit rate for the uplink and the downlink, other congestion control related information and/or other subscription information.

The group record contains for example the group identifier, information related to the entire group, such as the group load condition, the congestion parameter adjustment policies and a list of identifiers of communication terminals or bearers which belong to the group. The individual subscription records for communication terminals 3 in a group G and the group record are linked via the group identifier and the individual subscription identifiers, i.e. the group record for group G has a common group identifier and a list of identifiers of communication terminals 3 or bearers which belong to the group G. An individual subscription record for a communication terminal in group G may contain also a group identifier of the group G to which the terminal 3 is assigned. The inclusion of the group identifier in the individual subscription records may be advantageous in cases wherein the communication terminals require information on the group G to which they are assigned. An example thereof is provided below, where the common group identifier is included in a broadcast signal. Communication terminals 3 requiring information regarding the group to which they are assigned are then able to retrieve (select) the information from the broadcast signal that is relevant for the group.

It should be appreciated that a single communication terminal 3 can be assigned to more than one group.

There are no particular requirements to the formation of groups. Groups may e.g. (partially) overlap or be disjunct in their group members. Also a hierarchical structure may be used, wherein subgroups within a group G are created (e.g. all terminals served from a specific SGSN/S-GW). Neither is it required that all terminals are included in a group. In the context of congestion control, the formation of groups is expected to be guided by an assessment where congestion may be expected to occur.

The provision of a group record for a group of communication terminals 3 enables various new and inventive methods in the telecommunications network 1. In the present embodiment, the combination of congestion control and efficient message transmission using the common group identifier will be describe din further detail.

Figure 5:
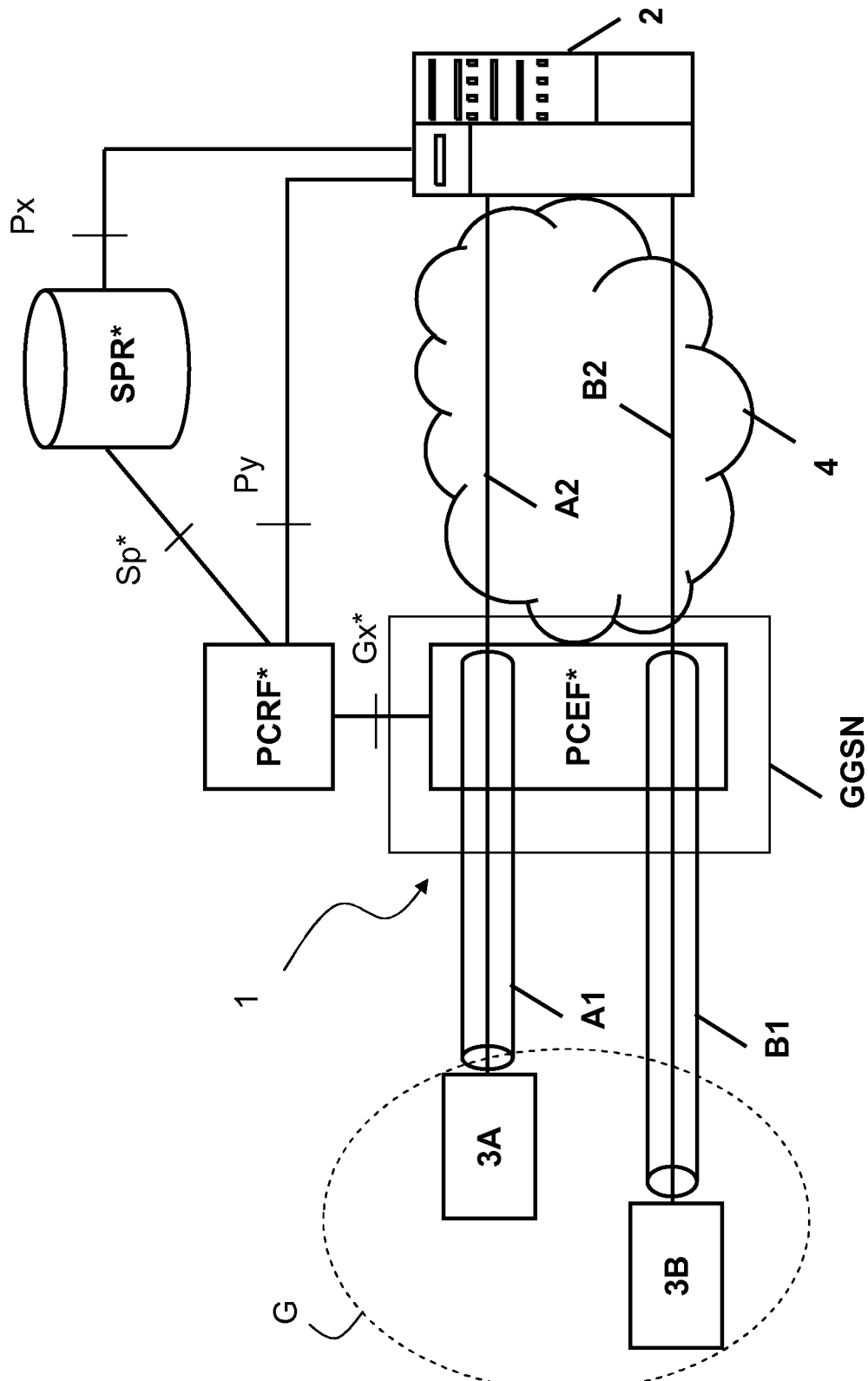
FIG. 5 is a schematic illustration of a telecommunication network according to an embodiment of the invention.

FIG. 5 shows a telecommunications network 1 comprising a PCC* architecture modified with respect to the PCC architecture of FIG. 3 as will be described below in further detail. A first and second communication terminal 3A, 3B, belonging to a group G communicate with a server 2 (e.g. for smart electricity metering in the home to provide the server 2 with metering data).

IP-CAN bearers A1 and B1 (in this case defined by PDP Contexts) are established between terminals 3A, 3B and the gateway (here the GGSN) of the telecommunications network. Data transported via such an IP-CAN bearer receives the QoS treatment associated with the IP-CAN bearer. The data sessions A2, B2 between the terminals 3A, 3B and the server 2 are supported by the IP-CAN bearers A1, B1 in the telecommunications network and further supported via network 4.

To ensure that the bearers A1 and B1 get the appropriate QoS characteristics, at bearer establishment the PCEF* consults the PCRF* via interface Gx*. The PCRF* in its turn consults the SPR* via interface Sp* on relevant subscription information. The PCRF* takes a policy decision and informs the PCEF* via interface Gx*. The PCEF* enforces these decisions.

As mentioned above, the group information for terminals 3A, 3B according to an aspect of the invention can be used to advantage for more efficient congestion control by the telecommunications network 1.

Figure 7A:
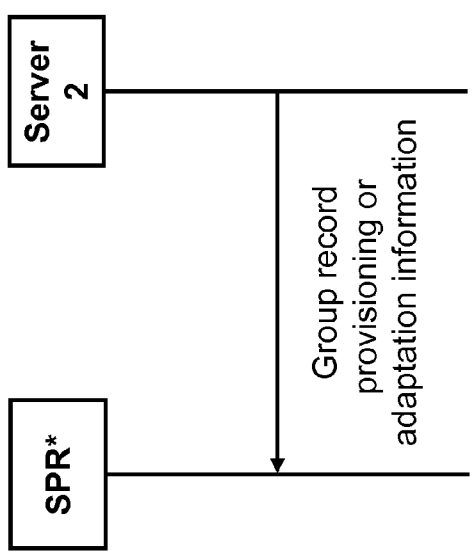
FIGS. 7A and 7B depict signal flow charts showing embodiment of provisioning of a telecommunications node by the server.
Figure 7B:
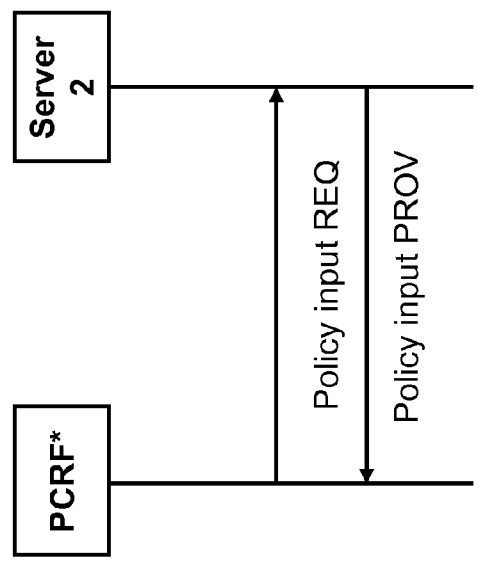

In an aspect of the invention, the provisioning interfaces Px and/or Py are defined allowing communication between the server 2 and the SPR* and/or the PCRF* as will be described further below with reference to FIGS. 7A and 7B.

A group record, as illustrated in FIG. 4B, applies to multiple communication terminals 3A, 3B that have a data session A2-B2 with the server 2 supported by bearers A1-B1, respectively. Group records are contained in the SPR*. The group information in the group record contains, for example, a bit rate threshold value that relates to the aggregate bit rate over all bearers A1, B1 of the terminals 3A, 3B in the group G. The sum of the maximum bit rate values of all individual subscriptions of the terminals 3A, 3B or of all bearers A1, B1 of the terminals 3A, 3B in the group G may be greater than the bit rate threshold value specified for the group G to profit from the statistical effect that it is highly unlikely that all communication terminals 3 in the group G will simultaneously exchange data with server 2 at the maximum bit rate specified in the individual subscription records.

The group record, as illustrated in FIG. 4B, may contain a group identifier, an identification of individual subscription IDs (e.g. IMSIs) of the terminals or bearers in the group and information related to the group such as the above-mentioned aggregate bit rate threshold for the group G.

The group record may also result in adding an identification of the group identification in the individual subscriptions that fall within the group. An individual subscription can be contained in multiple group subscriptions.

The policy decisions taken by PCRF* per individual communication terminal 3A, 3B are communicated via interface Gx* to a PCEF*. PCEF* enforces these decisions.

When a group load condition is satisfied, for example when the above-mentioned aggregate bit rate threshold specified in the group information for the group G is exceeded, the PCRF* is notified by the PCEF* and the PCRF* adjusts the individual policy decisions resulting in the modification of at least one of the bearers of the active terminals 3A, 3B in the group G. The PCRF* provides the PCEF* via interface Gx* with adjusted individual policy decisions. This may e.g. result in a downscaling of the maximum bit rate specified for bearers A1 and/or B1 and a decrease of the user data bit rate that is exchanged in the data sessions A2 and/or B2 between terminals 3A, 3B and the server 2.

It should be noted that the detection of satisfying a group load condition and reporting the event to PCRF* may also be performed by other entities than the PCEF*, including entities at locations different from the PCEF* location (e.g. in SGSN/S-GW or at the interface connecting a GGSN/P-GW to SGSN/S-GW), as will be described further with reference to FIG. 9.

In addition to the PCEF* just notifying the PCRF* about a congestion load condition being satisfied, it may include additional information with the congestion load condition fulfilled notification. The PCRF* may also request the PCEF* to monitor and report additional information. An example of additional information which may be monitored and reported by the PCEF* is a list of identifiers identifying one or more of the bearers (or data sessions or terminals) over which in the recent past data has been exchanged. The additional data may aid the PCRF* in making adjustments to its policy decisions and also to prioritise the bearers (or data sessions or terminals) to which the adjusted PCC rules should apply first, thus aiming at a more direct effect on resolving the congestion.

FIGS. 6A and 6B illustrate examples of an individual PCC rule and a group rule. Though the group rule differs from a common PCC rule, both are referred to as PCC rule in this description. The PCEF* receives those PCC rules from the PCRF* to enforce or implement them. As illustrated, the individual PCC rules contain information identifying the individual PCC rule, information used by the PCEF* to detect the related IP flow and information on the required QoS and Charging treatment, including for example the enforcement of a maximum bit rate for downlink and uplink, a guaranteed bit rate for downlink and uplink, an IP DiffServ DSCP marking and other congestion related information.

A group rule (FIG. 6B) similarly contains information identifying the group rule, information used by the PCEF* to detect the IP flow for the group (which may be aggregated from the individual flow detection information specified in the individual PCC rules for the bearers in the group) and in particular the group load condition.

In an alternative embodiment (indicated by the dashed line in FIG. 6B, a group rule may contain the PCC rule IDs for the terminals/bearers in the group, which information may serve to specify the flow detection for the terminals/bearers in the group.

As already mentioned in the summary of the invention, the disclosed method and system provide flexibility for the owner/operator of the server 2. Interaction between the server 2 and the SPR* over the Px provisioning interface, as illustrated in FIG. 7A, may e.g. result in the creation of a group record, the adaptation of this record, the adjustment of congestion threshold parameters for the individual terminals 3, the adjustment of other information in the group record, such as how to adjust the active bearers in the group once a group load condition is satisfied (see group record of FIG. 4B), etc. As illustrated in FIG. 7B, the PCRF* may also interact with the server 2 via a policy input request to retrieve information via a policy input provisioning message on how to adjust the active bearers in the group. Alternatively, the server may push this information to the PCRF*. The information may, of course, also be retrieved from the SPR* over the interface Sp*. Further, using e.g. the Px interface, further information on subgroups within a group and/or information regarding how (e.g. to which level(s)) and/or in which sequence to adjust the individual congestion related parameters can be contained in the group record and/or the individual subscription record.

Figure 8A:
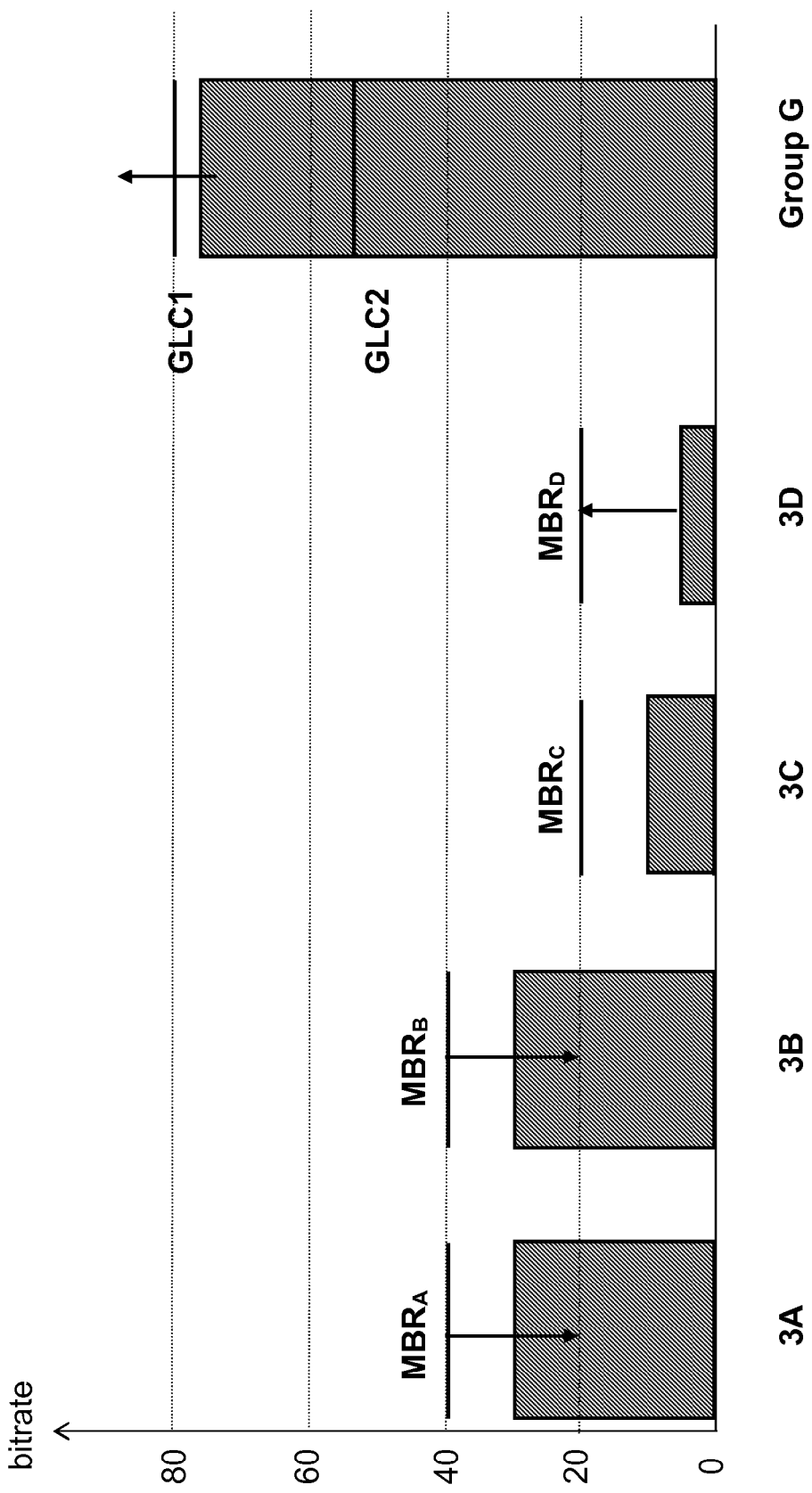
FIGS. 8A-8C depict schematic diagrams illustrating bit rate usage together with bit rate usage limits and a signal flow chart illustrating a method for congestion control according to an embodiment of the invention.
Figure 8B:
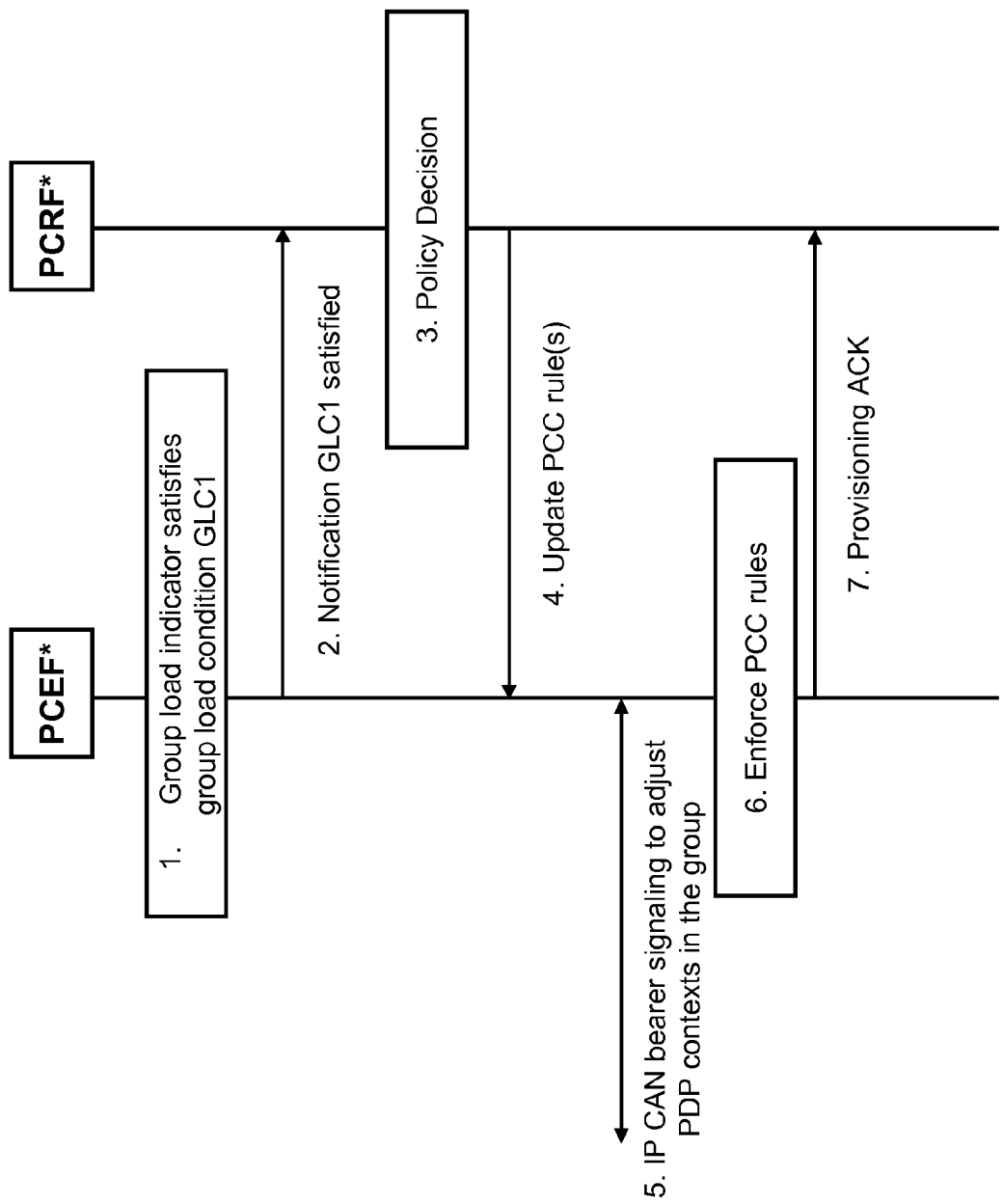

FIGS. 8A and 8B provide a first example of a method of controlling congestion in the telecommunications network 1 using the PCC* architecture of FIG. 5.

FIG. 8A shows an example of the usage of active terminals 3A-3D that triggers an interaction from the PCEF* with the PCRF*. Terminals 3A-3D have been assigned a common group identifier and thus belong to the same group G. The individual congestion parameters, here the subscribed maximum bit rate MBR, is 40 for terminals 3A, 3B and 20 for terminals 3C and 3D. All terminals 3A-3D have bearers established enabling active data sessions in the GPRS network 1 of FIG. 1. The group load condition GLC1 is defined as that congestion should be notified when the aggregate bit rate monitored for the group exceeds a value of 80. The PCEF* has accordingly been instructed by the PCRF* and monitors a group load indicator, e.g. the aggregate bit rate for the group G. As an example, assume that the actually used bit rate of terminals 3A, 3B is only 30, terminal 3C only 10 and terminal 3D only 5, as indicated by the hatched bars. Then, PCEF* may monitor a group load indicator with a value of 75, which does not satisfy the group load condition. In an alternative implementation, PCEF* may detect the group load condition in a more direct way, without explicitly determining a value for the aggregate bit rate for the group, e.g. by comparing the aggregate bit rate for the group with a reference rate such as in a token bucket or similar set to a bit rate of 80. In yet an alternative implementation, PCEF* may monitor the bit rate for each communication terminal 3 separately, for example as part of existing PCC rules, and sum the values related to each of the terminals in the group G to yield a group load indicator for group G.

When the PCEF* monitors that the group load condition GLC1 is satisfied (resulting e.g. from an increase in the bit rate of terminal 3D from 5 to 20 (illustrated in FIG. 8A by an upwardly pointing arrow for terminal 3D), the fulfilment of the group load condition GLC1 triggers the PCEF* to notify this condition to the PCRF*. The PCEF* may, optionally, provide additional information regarding the severity of the situation, allowing the PCRF* to take this into account.

The PCRF* adjusts the individual PCC rule for at least one of the communication terminals in group G. An adjustment may relate, for example, to downscaling the maximum bit rate. In FIG. 8A the values for the maximum bit rate (MBR) of the communication terminals 3A-3D are illustrated as $MBR_A$-$MBR_D$. In this example, the PCRF* decides to downscale the maximum bit rate parameter for communication terminals 3A and 3B, i.e. the value of $MBR_A$ and $MBR_B$, from 40 to 20. The PCEF*, after receiving updated PCC rule(s) from the PCRF*, adjusts the individual congestion parameters of the $MBR_A$-$MBR_D$ of the bearers (in this example, only $MBR_A$ and $MBR_B$ need to be adjusted) as shown by the downwardly pointing arrows for $MBR_A$ and $MBR_B$. The related terminals 3A and 3B will reduce their bit rate to 20 or less. In case a terminal would fail to comply to the adjusted data session communication parameter, such as MBR, this will be enforced by PCEF* in the usual way. In this example, the individual congestion parameters (MBR) are now all set to a value 20. The telecommunications network 1 will now not deliver a bit rate of more than 80 and group load condition GLC1 is no longer satisfied.

A downward adjustment of an individual congestion parameter value may, for example, be performed to a predetermined lower value, or by subtracting a predetermined value from the current parameter value or may be performed by taking a fraction (e.g. 70%) of the current parameter value. The downward adjustment of the parameter value may thus be different within a group.

The PCEF* may notify the PCRF* when the aggregate bit rate returns within the limits again. The PCRF* may also instruct PCEF* to apply a predetermined hysteresis before notifying congestion condition expiration.

An upward adjustment of the individual congestion parameters, such as the maximum bit rate values MBR, may be performed stepwise, with "feedback" from the PCEF*, for example after every step. The size of the upward adjustments and their distribution amongst the IP-CAN bearers or terminals 3A-3D is decided by the PCRF*. As an example, the distribution may be predefined in the group record stored in the SPR*, or the PCRF* may consult the server 2 via provisioning interface Py as illustrated in FIG. 7B or an upward adjustment may be requested by a communication terminal and then subject to approval from the PCRF* in the usual way.

It should be appreciated that the adjustment of the individual congestion parameters, either a downward adjustment of an upward adjustment, may be performed according to various policies as exemplified above. The congestion parameter adjustment policies for a group may be comprised in a group record, as schematically indicated in FIG. 4B.

As illustrated in FIG. 8A, a second group load condition GLC2 may be defined that functions as a lower trigger level for triggering the PCEF* to notify the PCRF*. When group load condition GLC2 is no longer satisfied, the PCRF* may decide on scaling up one or more of its previously set PCC rules for terminals 3A-3D in the group G that could benefit from a somewhat higher bit rate.

FIG. 8B provides a schematic flow chart of the communication between the PCEF* and the PCRF* in the above-described example for uplink traffic.

In step 1, PCEF* establishes that group load condition GLC1 or GLC2 is satisfied. In the present example, the PCEF* detects that the aggregate bit rate of the communication terminals 3 in group G exceeds a predetermined value at a particular point in time.

In step 2, the PCEF* notifies the PCRF* on the fact that the group load condition GLC1 is satisfied.

In step 3, a new policy decision is made by the PCRF*, for example a decision to scale down the maximum bit rate parameters (MBR) for the PCC rules and, consequently, for the bearers of terminals 3A and 3B of the group G. The information which bearers and/or which parameters should be adapted is determined by the congestion parameter adjustment policy or is e.g. obtained from the SPR* or from the server 2 as illustrated in FIG. 7A as described above.

In step 4, the PCEF* is informed of the adjusted individual PCC rules, illustrated in FIG. 6A, for terminals 3A and 3B. Updated group rules may also be provided to the PCEF* when the operator of the telecommunications network 1 may e.g. desire to adapt the group load condition GLC1 and/or GLC2.

In step 5, the IP-CAN bearers of the relevant communication terminals (in this example: for terminal 3A and for terminal 3B) are modified according to the adjusted PCC rule for that communication terminal. Each of the involved terminals (in this example: terminals 3A and 3B) is informed about the adjusted value of the individual congestion parameters (in this example with a downscaled value of the MBR) and the terminal will act accordingly. It is advantageous to use the group identifier of the group G and send a group update request to a network node further downstream in the telecommunications network 1 in order to adjust the data session communication parameters (e.g. PDP Context and IP-CAN bearer) of the communication terminals in the group G. This will explained in further detail below with reference to FIG. 9ff.

In step 6, the PCEF* enforces the new individual PCC rules, using the adjusted PCC rules for (in this example) terminals 3A and 3B.

Finally, in step 7, the PCEF* informs the PCRF* on the successful adjustment of the IP-CAN bearers and, possibly, about the establishment of an adjusted group load condition.

Of course, the process may be repeated from step 1 for additional notifications related to a same (possibly adjusted) group load condition or other such conditions and/or may be repeated from step 3, for example to further downwardly adjust individual congestion parameters when an earlier downward adjustment has not yet sufficiently resolved the congestion or to instruct an upward adjustment when PCRF* decides so.

Figure 8C:
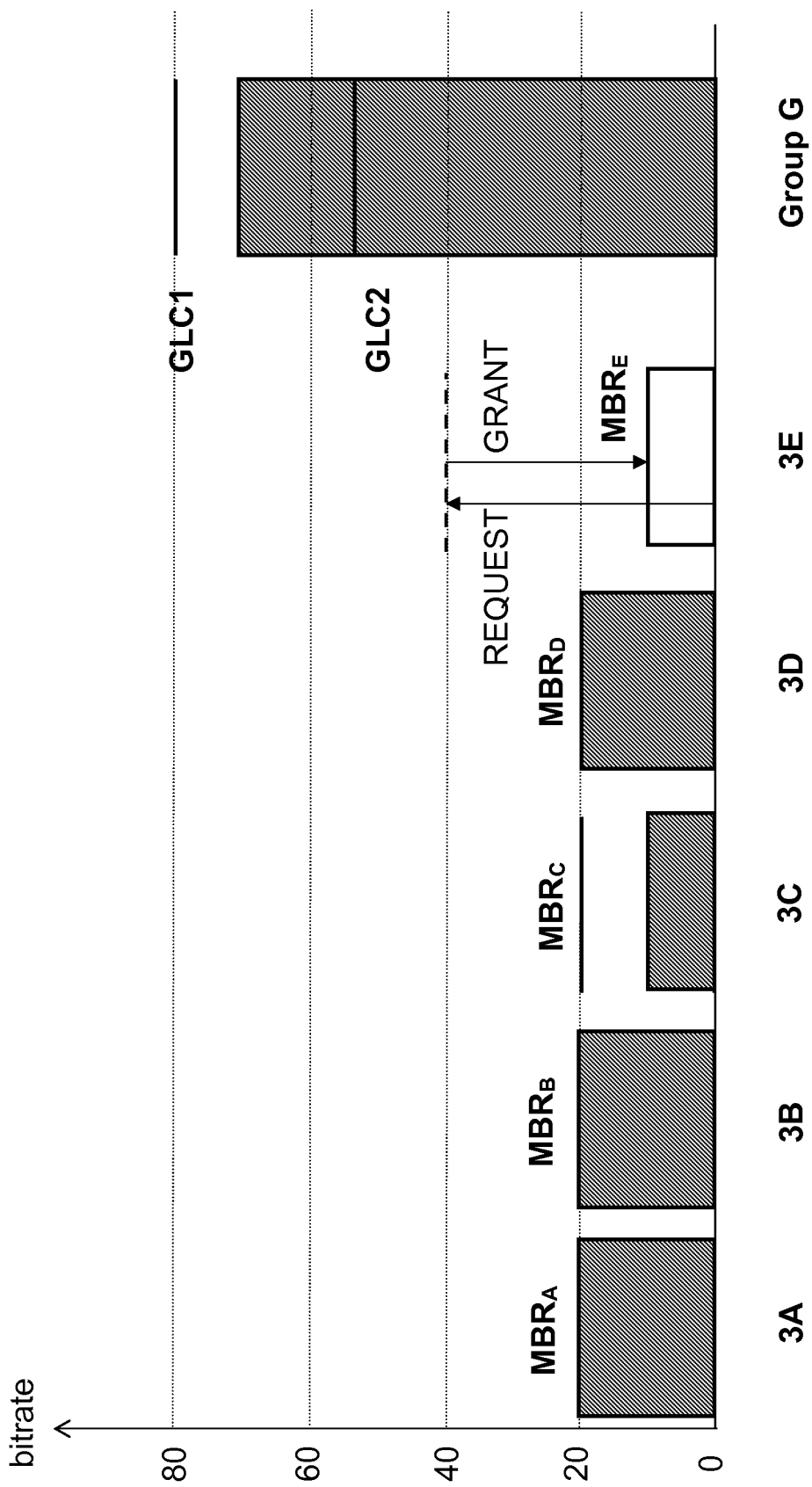

When the PCRF* is notified about a congestion condition, the PCRF* may, in addition to adjusting a congestion parameter of the bearer(s), also decide to make adjustments to its policy to authorise QoS resources to additional bearers which may be requested to be established or to additional data sessions which may request to become active in the group. This is illustrated in FIG. 8C for terminal 3E. For example, the PCRF* may decide to also adjust the maximum bit rate that may be authorised to additional bearers or sessions in group G from a value of e.g. 40 to a value of e.g. 10. When the additional terminal 3E in group G were to request to establish a bearer with an $MBR_E$ of e.g. 40, the PCRF* will take a policy decision. In this case, the PCRF* will not grant the requested $MBR_E$ of 40, which would otherwise be allowed, but it will issue a PCC rule with an $MBR_E$ of 10, shown by the downwardly pointing arrow for terminal 3E.

Generally, the common group identifier can be used to adjust the IP-CAN bearers, such as a PDP Context or a parameter of the IP-CAN, of a large number of communication terminals. Currently, a network-initiated modification of a particular PDP Context is supported by most modern telecommunications network technologies. The current techniques involve signalling between at least a network node and each of the communication terminals.

In the known method, modification of the PDP context of the bearers of each of the involved communication terminals induces a signalling load proportional to the number of IP-CAN bearers (normally, the number of terminals). In other words, IP-CAN bearer modification messages take place on a per-bearer basis. PDP context modification procedures are e.g. described in 3GPP TS 23.060. In addition, the load inherently peaks when a modification is initiated for a considerable number of communication terminals, as may e.g. be necessary in the above-mentioned method and system for congestion control wherein the communication terminals 3 of the group G need to be informed on the adjustment of the PCC rules for uplink traffic. This peak is also observed for the processing load of the involved network elements.

The common group identifier of communication terminals may be used to reduce the signalling load in the network when initiating adjustment of individual congestion parameters for the bearers of a considerable number of communication terminals. Also, the peak in signalling load and the processing load in the network elements can be reduced in this manner.

As an example, an IP-CAN bearer group modification procedure can be used that comprises the IP-CAN bearer modifications of the individual communication terminals 3. (Sub)groups are identified by common (sub)group identifiers in a HLR or HSS/SPR and communication terminals can be assigned to one or more of these groups.

Such a group modification procedure can e.g. be initiated in a network node as the GGSN/P-GW or the SGSN/S-GW upon detection of a trigger for such modification (see the earlier embodiment of satisfying the congestion load condition).

Figure 9:
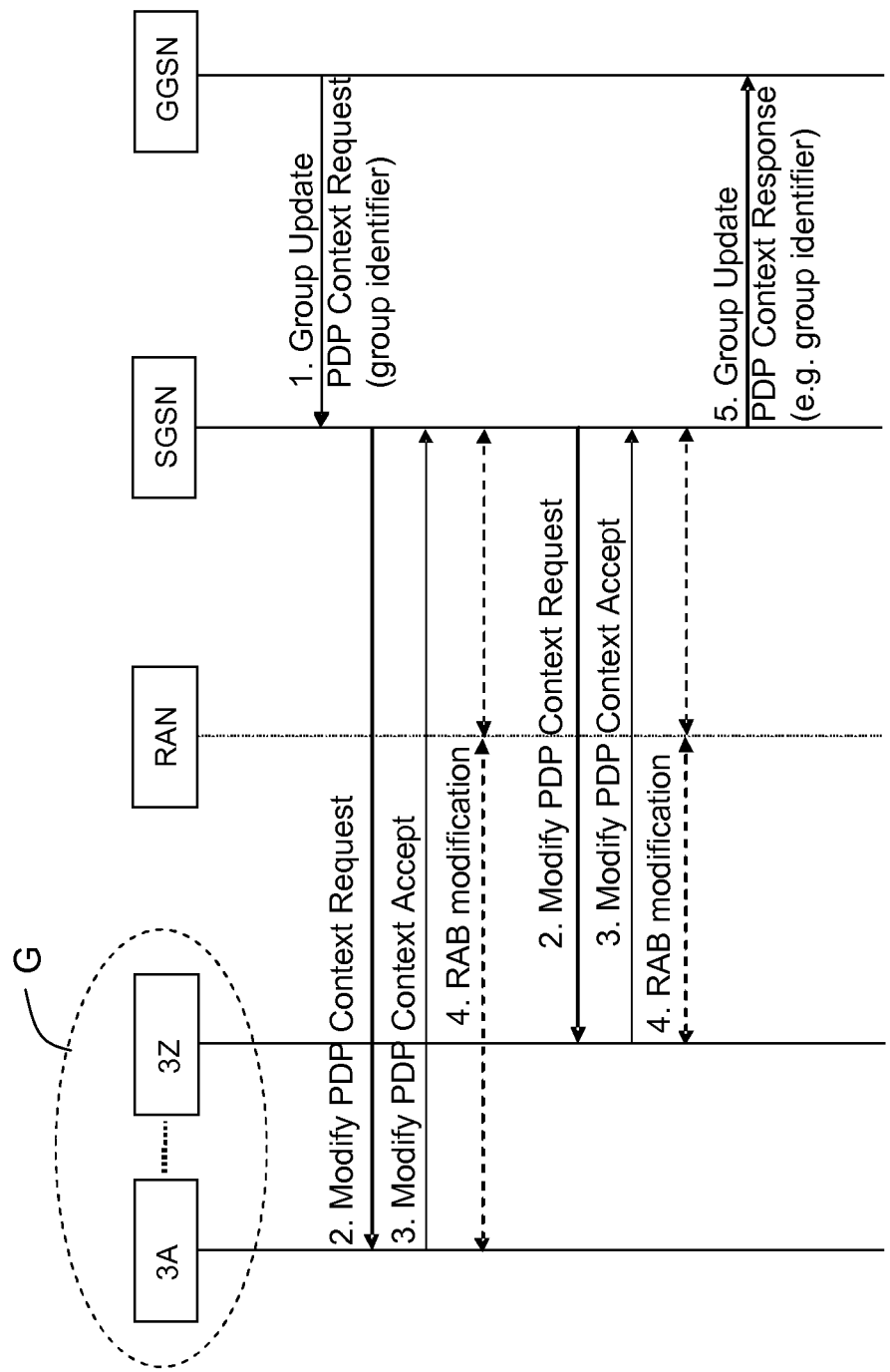
FIG. 9 depicts a signal flow chart showing an embodiment of a GGSN-initiated group PDP context modification procedure.

FIG. 9 is an embodiment of a GGSN-initiated group PDP context modification procedure for a group G comprising communication terminals 3A-3Z.

In the first step after a trigger (not shown), the GGSN sends a Group Update PDP Context Request to one or more SGSNs. This message contains e.g. a common group identifier as obtained from the group record stored in the HLR/SPR* or HSS/SPR*. The message also contains the QoS Requested parameter indicating the desired QoS profile for each of the bearers in the group G. Considerable efficiency is gained here, since only one request is transmitted from the GGSN to the SGSN as opposed to the prior art procedure wherein update requests are required for each bearer individually. The Group Update PDP Context Request may contain the IP-CAN bearer adjustment for the above-described congestion control method and telecommunications network 1.

The SGSN derives the involved communication terminals 3A-3Z from the Group Update PDP Context Request received from the GGSN by interacting with the HLR (as more generally illustrated in FIG. 2A) using the common group identifier. The information on the individual communication terminals 3A-3Z (i.e. the individual identifiers thereof) may be retrieved from the HLR (as more generally illustrated in FIG. 2A) and/or stored at the SGSN after retrieval.

The SGSN sends in step 2 a Modify PDP Context Request message to each terminal 3A-3Z comprising, amongst other information, the newly negotiated QoS. The newly negotiated QoS may have been restricted further by the SGSN.

Each terminal 3A-3Z may acknowledge the PDP Context Modification Request of step 2 by returning to the SGSN a Modify PDP Context Accept message. If a terminal 3A-3Z does not accept the newly negotiated QoS, it may instead de-activate the PDP context with a terminal-initiated PDP Context Deactivation procedure. The SGSN may then follow a terminal-initiated PDP Context Deactivation procedure (not shown).

At least in UMTS networks, a PDP Context modification also involves a RAB (Radio Access Bearer) modification. RAB modifications are performed immediately after a Modify PDP Context Request (step 2) or after a Modify PDP Context Accept (step 3) in step 4 for each individual communication terminal 3A-3Z. Alternatively, the RAB modification is performed after receiving the Modify PDP Context Accept of step 3 for each of the terminals.

Upon receipt of the Modify PDP Context Accept messages from all terminals 3A-3Z, or upon completion of all the RAB modification procedures (for UMTS networks), the SGSN returns a Group Update PDP Context Response message to the GGSN. This message contains e.g. the same common group identifier as contained in the Group Update PDP Context request received from the GGSN. In signalling message exchange it is also possible to use a transaction identifier, which value is assigned by the GGSN and the GGSN includes in the request of step 1 and which value the SGSN includes in its response in step 5, possibly as an alternative for the group identifier.

A group PDP Context modification as shown in FIG. 9 may also be initiated by an SGSN, for example, when the SGSN or an associated entity detects a congestion load condition as described earlier. In such a situation, the SGSN may advantageously immediately initiate a group PDP Context Modification, rather then only reporting the congestion condition to another network node (to e.g. the GGSN or to the PCEF*) and having other network entities initiating appropriate action. In this case it is assumed that a group has been defined wherein all data sessions (communication terminals) belonging to the group are under control of the SGSN. Then, a similar procedure can be followed as described for FIG. 9, where the interactions with the GGSN in the first and the last step of FIG. 9 are omitted. However, during or after completion of the modification, the SGSN notifies the GGSN about the modification, for which notification the common group identifier for that SGSN-oriented group may advantageously be used. Also, the SGSN may send a Group Update PDP Context Request to the GGSN and the GGSN may respond with a related response message to the SGSN in order to take information (e.g. limitations) available at the GGSN into account.

It should be appreciated that the procedure for group PDP Context modification as described with reference to FIG. 9 is not limited to modifications relating to congestion control and is not limited to modification of individual congestion parameters that may effect congestion resolution or relief. The procedure may also be used advantageously at other occasions where multiple PDP Contexts or similar contexts in other types of networks are to be modified and the procedure may also be used for other parameters, such as modification of the Access Point Name (APN), modification of the QoS class, modification of the DiffServ DSCP marking to be applied, etc.

It may be useful in particular cases to broadcast messages to a group of communication terminals. These messages contain the common group identifier and may e.g. contain information relating to congestion control or to other information relevant for a group G of communication terminals 3. In such cases, the communication terminals 3 should have (access to) the common group identifier in order to retrieve (select) the information from the broadcast. This information relating to the common group identifier may e.g. be obtained during an attach procedure to the telecommunications network 1, wherein the common group identifier(s) can be retrieved from the individual subscription record (see FIG. 4A) and transmitted to the terminal. The common group identifier(s) may also be stored or pre-programmed in (a module of) the communication terminal 3.

The broadcast embodiments may apply a cell broadcast centre CBC, known as such. Various architectures are possible, e.g. where the CBC is connected to a plurality of SGSNs/S-GWs and/or to a plurality of GGSNs/PG-W, as displayed in FIG. 10. Again, the message transmission may be initiated either by a SGSN or by a GGSN. Cell broadcast services are specified in 3GPP TS 23.041.

Figure 11:
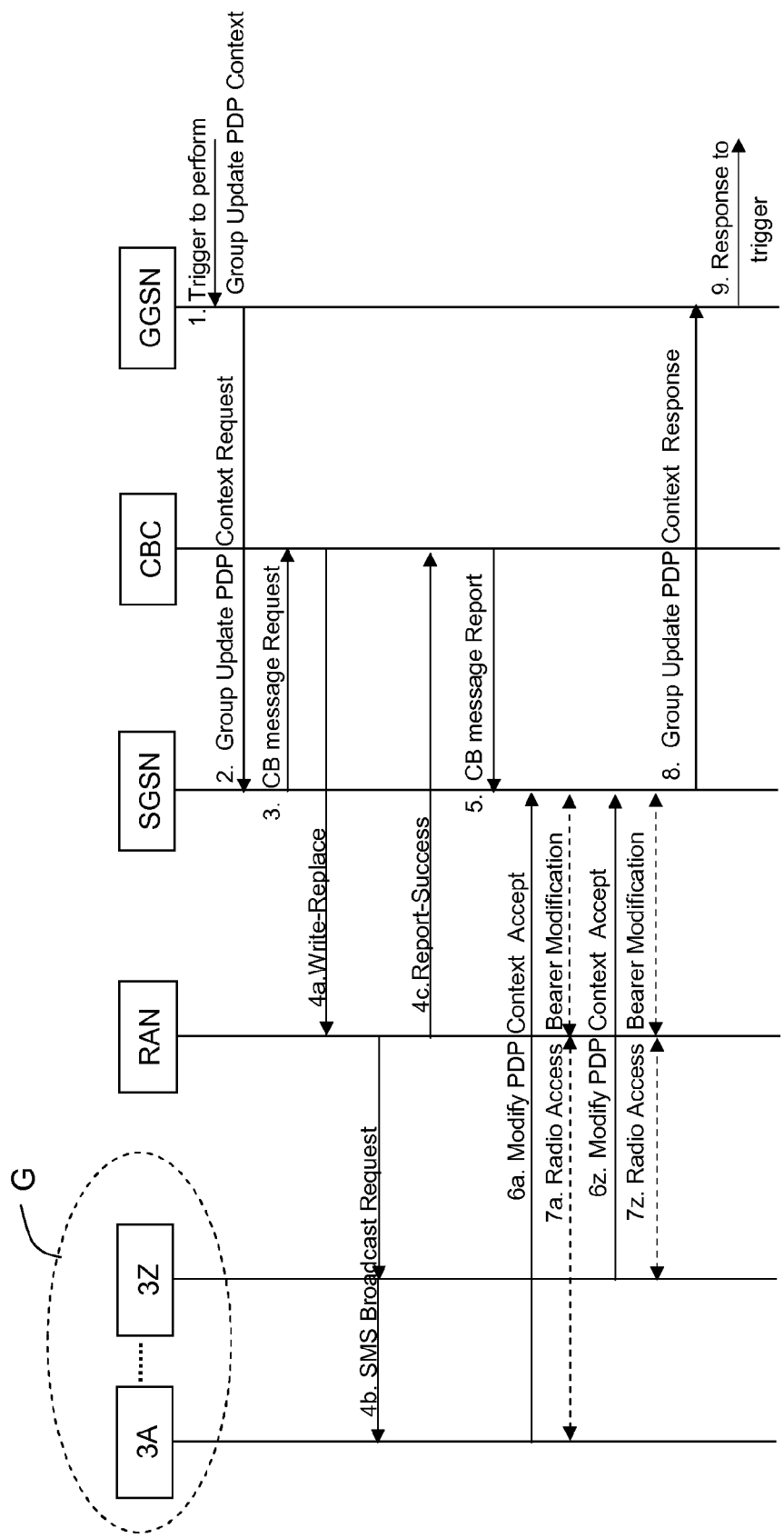
FIG. 11 depicts a signal flow chart showing an embodiment of a GGSN-initiated group PDP context modification procedure using cell broadcast technology.

FIG. 11 shows a flow chart for modifying the PDP Context of a group G of terminals 3A-3Z, wherein the GGSN initiates the group update PDP context request, when triggered (step 1) to modify the PDP context as described previously and the CBC is controlled by the SGSN.

The GGSN sends in step 2 a Group Update PDP Context Request to one or more SGSNs. This request contains at least the common group identifier for the group G of communication terminals 3A-3Z that has to be modified and information containing (a) parameter(s) indicating the desired QoS for the bearers of the communication terminals 3A-3Z in the group G. In order to ensure that all relevant SGSNs receive this request the GGSN may follow different approaches. One approach is that the GGSN sends the request to all SGSNs it connects to. Another approach is that the GGSN derives the relevant SGSNs (by consulting the HLR/HSS) and sends the request to the relevant SGSNs only. Yet another approach is that the GGSN, for each group, sets up a multicast group on which messages may be multi-casted. Then, the SGSN, when a PDP Context is set up for a terminal belonging to a certain group G, informs the GGSN that it subscribes to receiving all messages transmitted on the multicast group associated with group G. In the event of a group Update PDP Request, the GGSN only needs to insert a single message on the multicast group associated with group G to ensure that all relevant SGSNs (which all are subscribed to that group) receive the message.

The SGSN uses a broadcast or multicast technology to inform the communication terminals 3A-3Z in the group G on the update PDP context group request. More specifically, in this embodiment, Cell Broadcast (CB) is used. The SGSN acts a Cell Broadcast Entity (CBE) (see 3GPP TS 23.041). It defines the geographical areas, known as cell broadcast areas, in which the messages should be broadcasted. This could be all cells that are associated with the SGSN. In step 3, the SGSN sends a CB message Request to the CBC. This CB message contains the Modify PDP Context Group Request parameter, the common group identifier for the group G and (a) parameter(s) indicating the requested QoS for the PDP contexts in the group G.

In step 4a, the CBC transfers the CB message in Write-Replace messages to the RAN i.e. to one or more BSCs/RNCs according to the (defined) cell broadcast area. In turn the RAN, via an SMS Broadcast Request, requests to broadcast the CB message in the defined areas in step 4b. The CB message contains also the common group identifier for group G. Each communication terminal receiving the broadcast message is then able to determine whether or not the received message is destined for that terminal. That is the case when at least one of the group identifiers in a received message matches at least one of the terminal's group identifiers. A communication terminal with a group identifier $ID_G$ for group G, will thus recognise that a received broadcast message that comprises group identifier $ID_G$ is destined for that terminal as shown in step 4b of FIG. 11 and other terminals which received this message may ignore this message as irrelevant (not shown in FIG. 11). Alternatively, when multiple cell broadcast channels are available, the group identifier may determine to which of the channels the communication terminals should be tuned. In response to the Write-Replace the RAN sends a Report-Success, in step 4c. The broadcast of messages in this step 4 is according to the specification of Cell Broadcast Services, refer to 3GPP TS 23.041.

After having received all the Report-Success messages from the RAN i.e. from all the involved BSCs/RNCs, the CBC sends a CB message Report to the SGSN in step 5. Also, the communication terminals 3A-3Z, having received the CB message and having recognised the message as destined for it, in step 4b accept the modification requests in steps 6a-6z. Each of them sends an ordinary Modify PDP Accept message (eventually including an identification of the group G of the communication terminals 3A-3Z to which the PDP context belongs) to the SGSN. As indicated before, it is also common to use a transaction identifier, which value could be assigned by the SGSN and the SGSN includes it in the group Modify PDP Context request in the CB message request of step 3 and which value each of the terminals 3A-3Z includes in its response in step 6a-z.

In steps 7a-7z, Radio Access Bearer (RAB) modification is performed for each of the terminals 3A-3Z individually after receiving the Modify PDP Context Accept messages 6a-6z for an individual terminal. Again, these steps 7a-7z may also be performed after receiving all individual Modify PDP Context Accept messages (steps 6*a*-6*z*).

Upon handling of the Modify PDP Context procedures from all communication terminals 3A-3Z in the group G, the SGSN returns a Group Update PDP Context Response message to the GGSN in step 8. This message contains at least the common group identifier for the group G. As indicated before, it is also common to use a transaction identifier, which value is assigned by the GGSN and the GGSN includes in the group Update PDP Context Request of step 2 and which value the SGSN includes in its response in step 8.

Finally, the GGSN may inform the entity that triggered the group-wise modification of the PDP contexts on the outcome of the PDP context modification (step 9).

As already noted, other variants of the embodiment of FIG. 11 are possible. As an example, the GGSN may be triggering the CBC to send the modification requests to the communication terminals 3A-3Z in the group G. The cell broadcast interaction will then be between the GGSN and the CBC instead of between the SGSN and the CBC. Step 2 will then be an information message from the GGSN to the SGSN also including the notification that the GGSN will act as a Cell Broadcast Entity (CBE).

In another envisaged embodiment, the SGSN (instead of the GGSN) will be triggered to initiate the modification for the group G of communication terminals 3A-3Z. The SGSN may then send a Group Update PDP Context Request to the GGSN and the GGSN may return a Group Update PDP Context Response message to the SGSN.

In still another embodiment, the SGSN is triggered to initiate the modification of the group G of communication terminals 3A-3Z (like in the previous embodiment), but the GGSN will act as the CBE. The SGSN, internally triggered, sends a Group Update PDP Context Request to the GGSN. The GGSN returns a Group Update PDP Context Response Message to the SGSN. The Cell Broadcast interaction occurs between the GGSN and the CBC and the GGSN informs the SGSN that it will act as the CBE.

The invention claimed is:

1. A method for information transmission in a machine-to-machine telecommunications network, the telecommunications network supporting information transmission between a server and a plurality of communication terminals, wherein the machine-to-machine telecommunications network is configured for broadcasting over a plurality of broadcast channels, the method comprising the steps of:
   storing a common group identifier assigned to a group containing at least some of the plurality of terminals;
   assigning the group of communication terminals identified by the common group identifier to a particular channel of the plurality of broadcast channels;
   transmitting in at least a part of the machine-to-machine telecommunications network an information message over the particular broadcast channel assigned to the group of communication terminals identified by the common group identifier, wherein the information message contains the common group identifier and the information message or the information contains bearer modification information;
   wherein the machine-to-machine telecommunications network is configured for supporting one or more active data sessions between a server and at least a first and second communication terminal of the plurality of communication terminals by providing at least a first and a second bearer, respectively, the method further comprising the steps of:
   storing a first individual congestion parameter for the first bearer and a second individual congestion parameter for the second bearer of the first and second communication terminals, respectively;
   monitoring in the telecommunications network a group load indicator defined for the group of at least the first and the second terminal corresponding to the common group identifier;
   comparing the group load indicator of the group with a group load condition of the group of the at least first and second communication terminals corresponding to the common group identifier;
   controlling congestion in the telecommunications network by adjusting at least one of the first individual congestion parameter of the first bearer and the second individual congestion parameter of the second bearer when the group load indicator satisfies the group load condition;
   transmitting the bearer modification information to the first and/or the second communication terminal for which the individual congestion parameter has been adjusted.

2. The method according to claim 1, further comprising the step of transmitting the common group identifier to the plurality of communication terminals.

3. The method according to claim 1, wherein the first and second individual congestion parameters, the group load indicator and the group load condition comprises a maximum bit rate.

4. The method according to claim 1, wherein the server is connected via a provisioning interface to a network node storing the common group identifier, the method comprising the step of assigning the common group identifier to the plurality of communication terminals via the provisioning interface.

5. The method according to claim 1, further comprising the steps of:
   storing a first common group identifier for a first group of communication terminals of the plurality of terminals and a second common group identifier for a second group of communication terminals of the plurality of communication terminals, wherein the first communication terminal is assigned to both the first group and the second group;
   transmitting a first information message and a second information message to the first communication terminal, wherein the first information message contains the first common group identifier and the second information message contains the second common group identifier.

6. The method according to claim 1, further comprising the step of transmitting a broadcast channel identifier to the plurality of communication terminals, wherein the broadcast channel identifier identifies the particular broadcast channel assigned to the group of terminals.

7. A machine-to-machine telecommunications network supporting information transmission between a server and a plurality of communication terminals, the telecommunications network comprising:
   a first storage node configured for storing a common group identifier assigned to a group containing at least some of the plurality of terminals;
   a transmitter arrangement configured for including the common group identifier in an information message and transmitting the information message containing the common group identifier to the plurality of communication terminals identified by the common group identifier;

a second storage node configured for storing an individual terminal identifier of each of the individual terminals of the group in the telecommunications network;

a first network node configured for sending the information message containing the common group identifier;

a second network node configured for receiving the information message containing the common group identifier and for retrieving the individual terminal identifier of each of the terminals from the second storage node using the common group identifier;

wherein the second network node is configured for transmitting information messages to the individual communication terminals, wherein each of the information messages contains the individual terminal identifier of the individual communication terminal.

8. A machine-to-machine telecommunications network supporting information transmission between a server and a plurality of communication terminals, the telecommunications network comprising:

a first storage node configured for storing a common group identifier assigned to a group containing at least some of the plurality of terminals;

a transmitter arrangement configured for including the common group identifier in an information message and transmitting the information message containing the common group identifier to the plurality of communication terminals identified by the common group identifier, the machine-to-machine telecommunications network being configured for enabling data sessions between the server and at least a first and a second communication terminal of the plurality of communication terminals by providing at least a first and a second bearer, respectively, the machine-to-machine telecommunications network further comprising:

the first storage node storing the common group identifier assigned to the group comprising the at least first and second communication terminal;

a third storage node storing a first individual congestion parameter for the first bearer and a second individual congestion parameter for the second bearer of the first and second communication terminals, respectively;

a monitoring module configured for monitoring a group load indicator defined for the group of the at least first and second communication terminal corresponding to the common group identifier;

an analyser configured for comparing the group load indicator with a group load condition of the group of the at least first and second communication terminal corresponding to the common group identifier;

a congestion controller configured for congestion control in the telecommunications network by adjusting at least one of the first individual congestion parameter of the first bearer and the second individual congestion parameter of the second bearer when the group load indicator satisfies the group load condition;

the transmitter arrangement being configured for containing bearer modification information in the information message to the first and/or the second communication terminal for which the individual congestion parameter has been adjusted.

* * * * *